May 31, 1938.   W. E. NEWMAN   2,118,859
REDUCTION GEAR DEVICE
Filed April 28, 1934
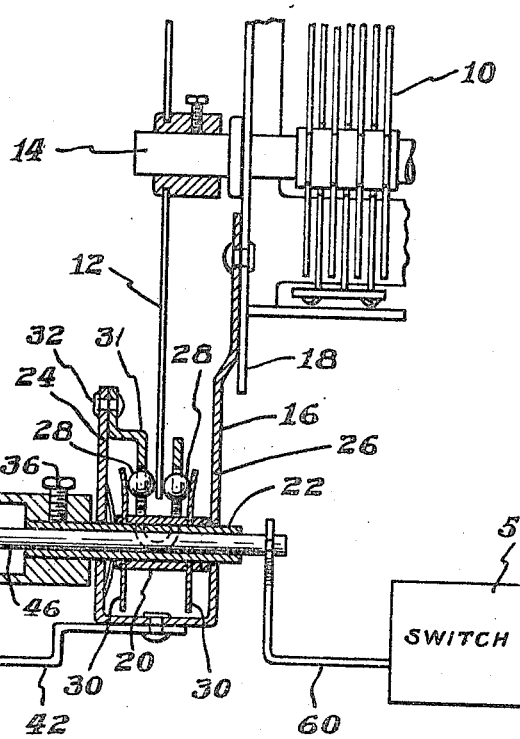
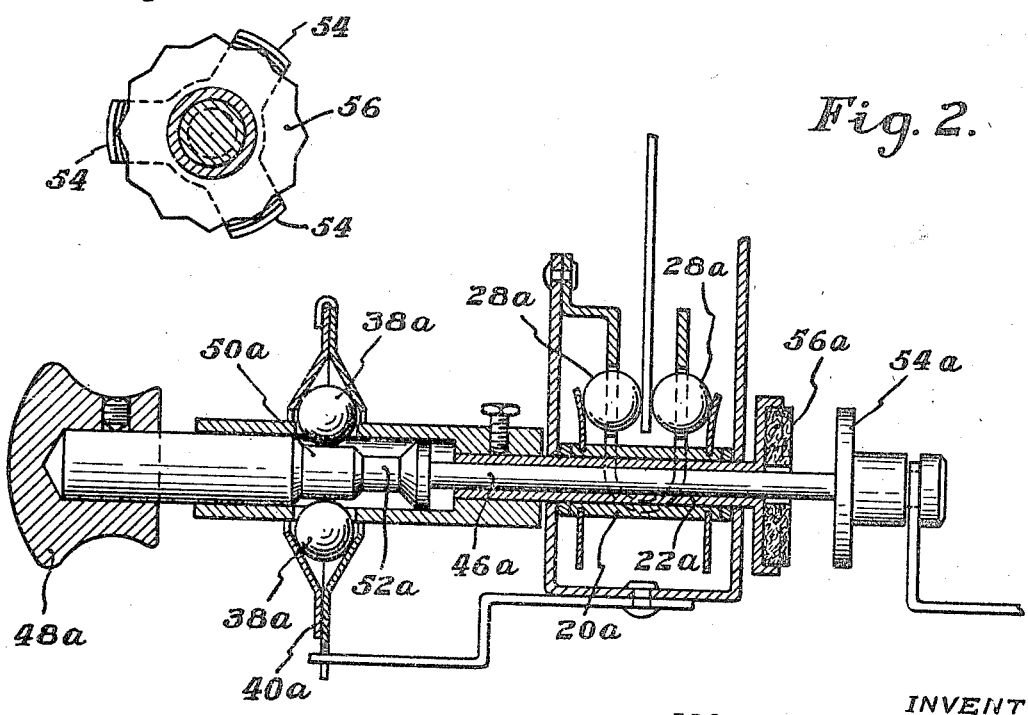
INVENTOR:
William E. Newman
BY Goldsborough
ATTORNEY Patented May 31, 1938

2,118,859

UNITED STATES PATENT OFFICE 2,118,859

REDUCTION-GEAR DEVICE

William E. Newman, Merchantville, N. J., assignor to Radio Corporation of America, a corporation of Delaware Application April 28, 1934, Serial No. 722,849

7 Claims. (Cl. 74—10)

My invention relates to improvements in reduction-gear devices for making fine adjustments of mechanical members, and more particularly to a device of this character for making adjustments of a variable reactor, such as a capacitor in an all-wave radio receiver.

In the various all-wave radio receivers constructed heretofore, separate knobs or other manually operable members have been provided for making adjustments of the variable capacitor, one of these being used for adjustments in the broadcast band, the other being used for making adjustments in the short-wave band.

With the foregoing in mind, it is one of the objects of my invention to provide an improved device of the character referred to wherein all adjustments are made by turning a single knob.

Another object is to provide an improved device of the character referred to whereby different ratios of gear reduction between the variable capacitor and the control knob can be obtained by a relatively slight movement of the knob.

Other objects and advantages will hereinafter appear.

For the purpose of illustrating my invention, an embodiment thereof is shown in the drawing, wherein Figure 1 is a fragmentary, sectional view, partly diagrammatic, of a reduction-gear device constructed and operating in accordance with my invention;

Fig. 2 is a view similar to Fig. 1, showing a modification; and

Fig. 3 is a sectional view, the section being taken on a line corresponding to the line 3—3 in Fig. 1.

With reference to Fig. 1, the condenser 10 of the radio receiver is adjusted by rotating a disc 12 fixed on the condenser shaft 14. For this purpose, a U-shaped supporting member 16 is secured as shown to the front plate 18 of the condenser. A spool 20 is fixed on a hollow shaft 22 which is journalled in the spaced parallel sides 24 and 26 of the member 16.

Complementary rotary elements in the form of balls 28, are supported between the ends 30 of the spool, and on the same side of the axis of rotation of the latter and in line, parallel to the axis.

The supporting means for the balls 28 is in the form of a U-shaped retainer member 31 fixed to the member 16 by rivets 32 and provided in the U with circular holes in which the balls 28 have a free running fit. The bottom of the member 31 is cut away, as shown, to accommodate the hub or shank of the spool 20.

The edge of the disc 12 is disposed between the balls 28 which are pressed against this disc by the spool ends 30 which are of spring material and are slightly flexed, as shown, when the edge of the disc 12 is forced between the balls. To obtain this action, the distance between the spool ends 30 is made slightly less than twice the diameter of one of the balls 28 plus the thickness of the disc 12.

A hollow member 34 is fixed on the end of the shaft 22 by a stud screw 36, and is provided with openings for receiving a number of balls 38. A ball race 40 is disposed about the member 34 and is held against rotation by an arm 42 fixed to the supporting member 16 and which engages an extension 44 with which the race is provided. A shaft 46 extends through the member 34 and the hollow shaft 22, and has a sliding fit in the latter. The shaft 46 is moved axially and rotated about its own axis by a knob 48 fixed on the end of the shaft.

When the shaft is in the lefthand position shown, a section 50 of the shaft engages the balls 38. The diameter of the section 50 is such that when the shaft is in this position the balls 38 have a good rolling contact with the shaft and with sides of the race 40. When the shaft is rotated, therefore, the balls 38 roll about the race with a planetary action, and in this way the member 34 and the spool 20 are rotated.

The diameter of the section 52 of the shaft adjacent the section 50 is less than the diameter of the latter. When the shaft 46 is shifted axially to the right, therefore, the section 52 is disposed within the race 40 and the balls 38 are released from their driving contact with the race. With the shaft in this position, also, clutch elements 54 of spring material engage the edge of a flange or disc 56 with which the member 34 is provided. The edge of the flange 56 is serrated as shown in Fig. 3, and the disposition of the elements 54 is such that when the shaft 46 is shifted to the right these elements are sprung outwardly slightly, and grip the serrated edge of the disc 56. The member 34 and the spool 20 are in this way connected directly to the shaft 46.

When the shaft has been shifted to the right, reverse axial movement is inhibited by the gripping action of the spring-clutch elements 54 and to a lesser extent by the fact that to achieve such reverse axial movement the balls must ride over the beveled edges intermediate shaft sections 52 and 50. When the shaft is in the left hand position the balls are pressed against section 50 of shaft 26 by the retaining walls of the race 40.

This inhibits undesired movement of the shaft to the right. Excessive movement to the left is prevented by the rim on the inner end of shaft section 50.

The reference numeral 58 designates a wave-change switch of any suitable construction for an all-wave receiver. This switch is connected to the shaft 46 by a member 60 and is actuated upon axial movement of the shaft. The arrangement is such that the switch is in the position for reception on the short-wave band when the shaft 46 is in the lefthand position shown, and is in position for reception on the broadcast band when the shaft is shifted axially to the righthand position.

With the shaft 46 in the lefthand position shown, there is a high gear reduction to the condenser shaft 14, rotation of the shaft 46 causing the balls 38 to roll about the race 40 and rotate the member 34 and the spool 20. Upon rotation of the spool 20, the balls 28 are rotated by the spool ends 30 to cause rotation of the disc 12.

When it is desired to receive on the broadcast band, the knob 48 is pushed inwardly to shift the shaft 46 to the righthand position. In this position, the switch 58 is changed for reception on the broadcast band, and the reduced section 52 of the shaft is disposed within the race 40 to release the balls 38. Also, the spring elements 54 grip the flange 56 so that the member 34 and the spool 20 are connected directly to the shaft 46. When the knob 48 is turned, therefore, the only gear reduction between the shafts 46 and 14 is that provided by the balls 28 and the associated parts.

In the modification shown in Fig. 2, the arrangement is the reverse of that in Fig. 1. That is, when the shaft 46a is in the righthand position, the balls 38a are engaged by the section 50a of the shaft which corresponds to and serves the same purpose as the section 50 of the shaft 46 in Fig. 1. In this position of the shaft 46a, therefore, the condenser shaft is driven through the balls 38a and the balls 28a.

To remove the gear reduction provided by the balls 38a, the knob 48a is pulled outwardly to shift the shaft 46 to the lefthand position. In this position of the shaft the reduced section 52a is disposed within the ball race 40a to receive the balls 38a and release them from driving engagement with the shaft and the sides of the ball race. Also, in this position of the shaft 46a a clutch member 54a fixed on the outer end of the shaft engages the complementary clutch member 56a with which the hollow shaft 22a is provided. The spool 20a is, therefore, connected directly to the shaft 46a.

The construction and manner of operation of the embodiment of my invention shown in Fig. 2 is otherwise the same as that shown in Fig. 1.

From the foregoing it will be seen that I have provided an improved reduction-gear device which is particularly adapted for making fine adjustments of a tuning condenser in a radio receiver, and in which there is a single knob for making all adjustments in an all-wave receiver, and by which the ratio of gear reduction to the condenser shaft can be changed.

It will be understood that various modifications, such as in the size, shape and arrangement of parts, can be made without departing from the spirit of my invention or the scope of the claims.

I claim as my invention:

1. In a reduction-gear device for adjusting electrical tuning apparatus, a shaft supported for axial movement and for rotation about its axis, a member disposed about said shaft for rotation about said axis, a ball race disposed about said member and fixed against rotation therewith, and balls disposed in said race, said member being provided with openings for receiving said balls and in which the same have a free fit, the diameter of a section of said shaft being sufficient to engage said balls and hold the same in contact with said race, said section being movable into and out of operative association with said balls upon axial movement of said shaft, said member and said shaft being provided respectively with complementary parts each extending laterally from said member and shaft and engageable with each other to connect said member directly to said shaft when the latter is moved axially to the position whereat said shaft section is out of operative association with said balls, and means inhibiting a reverse axial movement of said shaft when it is in said position.

2. In a reduction-gear device for adjusting electrical tuning apparatus, a part in the form of a shaft supported for axial movement and for rotation about its axis, a second part in the form of a member disposed about said shaft for rotation about said axis, and reduction-gear means for connecting said shaft and member, a section of said shaft forming part of said reduction-gear means and movable into and out of operative relation with respect to the latter upon axial movement of said shaft, one of said parts being provided with a serrated edge and the other of said parts being provided with clutch means adapted to grip and to hold said edge when said shaft is moved axially to the position whereat said shaft section is out of operative relation with respect to said reduction-gear means whereby said member is connected directly to said shaft for rotation therewith.

3. In a reduction-gear device for adjusting electrical tuning apparatus, a shaft supported for axial movement and for rotation about its axis, a sleeve disposed about said shaft for rotation about said axis, an end portion of said shaft extending axially beyond said sleeve whereby a moving force may be applied directly to said shaft, and reduction-gear means for connecting said shaft and sleeve, a section of said shaft forming part of said reduction-gear means and movable into and out of operative relation with respect to the latter upon axial movement of said shaft, said shaft and sleeve being provided respectively with complementary clutch elements for engagement when said shaft is moved axially to the position whereat said shaft section is out of operative relation with respect to said reduction-gear means whereby said sleeve is connected directly to said shaft for rotation therewith, and means responsive to the axial movement of said shaft for maintaining said shaft and sleeve in direct driving relation.

4. In a reduction-gear device for adjusting electrical tuning apparatus, a part in the form of a shaft supported for axial movement and for rotation about its axis, a second part in the form of a member disposed about said shaft for rotation about said axis, an end of said shaft extending axially beyond said member whereby a moving force may be applied directly to said shaft, and reduction-gear means for connecting said shaft and member, a section of said shaft forming part of said reduction-gear means and movable into and out of operative relation with respect to the latter upon axial movement of said shaft, one of said parts being provided with a serrated edge disposed adjacent said end of said shaft and the other of said parts being provided with a resilient clutch element adapted to grip and to hold said edge when said shaft is moved axially to the position whereat said shaft section is out of operative relation with respect to said reduction-gear means whereby said member is connected directly to said shaft for rotation therewith.

5. In a reduction-gear device for adjusting electrical tuning apparatus, a part in the form of a shaft supported for axial movement and for rotation about its axis, a second part in the form of a member disposed about said shaft for rotation about said axis, and reduction-gear means for connecting said shaft and member and disposed about and supported by said member, a section of said shaft forming part of said reduction-gear means and movable into and out of operative relation with respect to the latter upon axial movement of said shaft, one of said parts being provided with a serrated edge and the other of said parts being provided with clutch means disposed for engagement with said edge when said shaft is moved axially to the position whereat said shaft section is out of operative relation with respect to said reduction-gear means whereby said member is connected directly to said shaft for rotation therewith, and means responsive to said axial movement of said shaft to said position for inhibiting a reverse axial movement of said shaft.

6. In a reduction-gear device for adjusting electrical tuning apparatus, a part in the form of a shaft supported for axial movement and for rotation about its axis, a second part in the form of a member disposed about said shaft for rotation about said axis, an end of said shaft extending axially beyond said member whereby a moving force may be applied directly to said shaft, the other end of said shaft extending axially beyond the respective adjacent end of said member, reduction-gear means for connecting said shaft and member, a section of said shaft forming part of said reduction-gear means and movable into and out of operative relation with respect to the latter upon axial movement of said shaft, said other end of said shaft and said adjacent end of said member being provided respectively with complementary clutch means disposed for engagement when said shaft is moved axially to the position whereat said shaft section is out of operative relation with respect to said reduction-gear means whereby said member is connected directly to said shaft for rotation therewith, and means responsive to said axial movement of said shaft to said position for inhibiting a reverse axial movement of said shaft.

7. In a reduction-gear device for adjusting tuning apparatus, a part in the form of a shaft supported for axial movement and for rotation about its axis, a second part in the form of a member disposed about said shaft for rotation about said axis, reduction-gear means for connecting said shaft and member and supported by said member, a section of said shaft forming part of said reduction-gear means and movable into and out of operative relation with respect to the latter upon axial movement of said shaft, said parts being provided respectively with complementary clutch means disposed for engagement when said shaft is moved axially to the position whereat said shaft section is out of operative relation with respect to said reduction-gear means whereby said member is connected directly to said shaft for rotation therewith, and means responsive to said axial movement of said shaft to said position for inhibiting a reverse axial movement of said shaft.

WILLIAM E. NEWMAN.